United States Patent
Harner et al.

(10) Patent No.: US 10,828,667 B1
(45) Date of Patent: Nov. 10, 2020

(54) REMOVAL OF EPOXIES FROM METAL SUBSTRATES

(71) Applicant: United Technologies Corporation, Farmington, CT (US)

(72) Inventors: John Harner, Vernon, CT (US); Danielle E. Jencks, Rocky Hill, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 16/434,932

(22) Filed: Jun. 7, 2019

(51) Int. Cl.
| | |
|---|---|
| *B05D 3/10* | (2006.01) |
| *B05D 5/00* | (2006.01) |
| *B05D 5/10* | (2006.01) |
| *B05D 3/12* | (2006.01) |
| *B05D 7/14* | (2006.01) |

(52) U.S. Cl.
CPC ............... *B05D 5/005* (2013.01); *B05D 3/10* (2013.01); *B05D 3/12* (2013.01); *B05D 5/10* (2013.01); *B05D 7/14* (2013.01)

(58) Field of Classification Search
CPC . B05D 5/005; B05D 5/10; B05D 3/10; B05D 3/12; B05D 7/14
USPC .................................................. 427/140, 142
See application file for complete search history.

(56) References Cited

U.S. PATENT DOCUMENTS

| | | | |
|---|---|---|---|
| 4,991,359 A * | 2/1991 | Ogitani | .................... B24B 1/00 51/293 |
| 5,985,127 A | 11/1999 | Greenslade | |
| 9,770,791 B2 | 9/2017 | Hong | |
| 2017/0129215 A1* | 5/2017 | Ding | ...................... B32B 15/08 |
| 2019/0024256 A1* | 1/2019 | Riehl | ..................... B05D 5/005 |

* cited by examiner

*Primary Examiner* — Michael P Wieczorek
(74) *Attorney, Agent, or Firm* — Kinney & Lange, P.A.

(57) ABSTRACT

A method of repairing a defectively manufactured multi-layer component having a substrate material and a primer layer includes applying, to the primer layer, a solvent that causes the primer layer to swell to form a swelled primer layer. The method also includes abrading away the swelled primer layer from the multi-layer component and rebuilding the multi-layer component by forming a new primer layer on the substrate material.

9 Claims, 2 Drawing Sheets

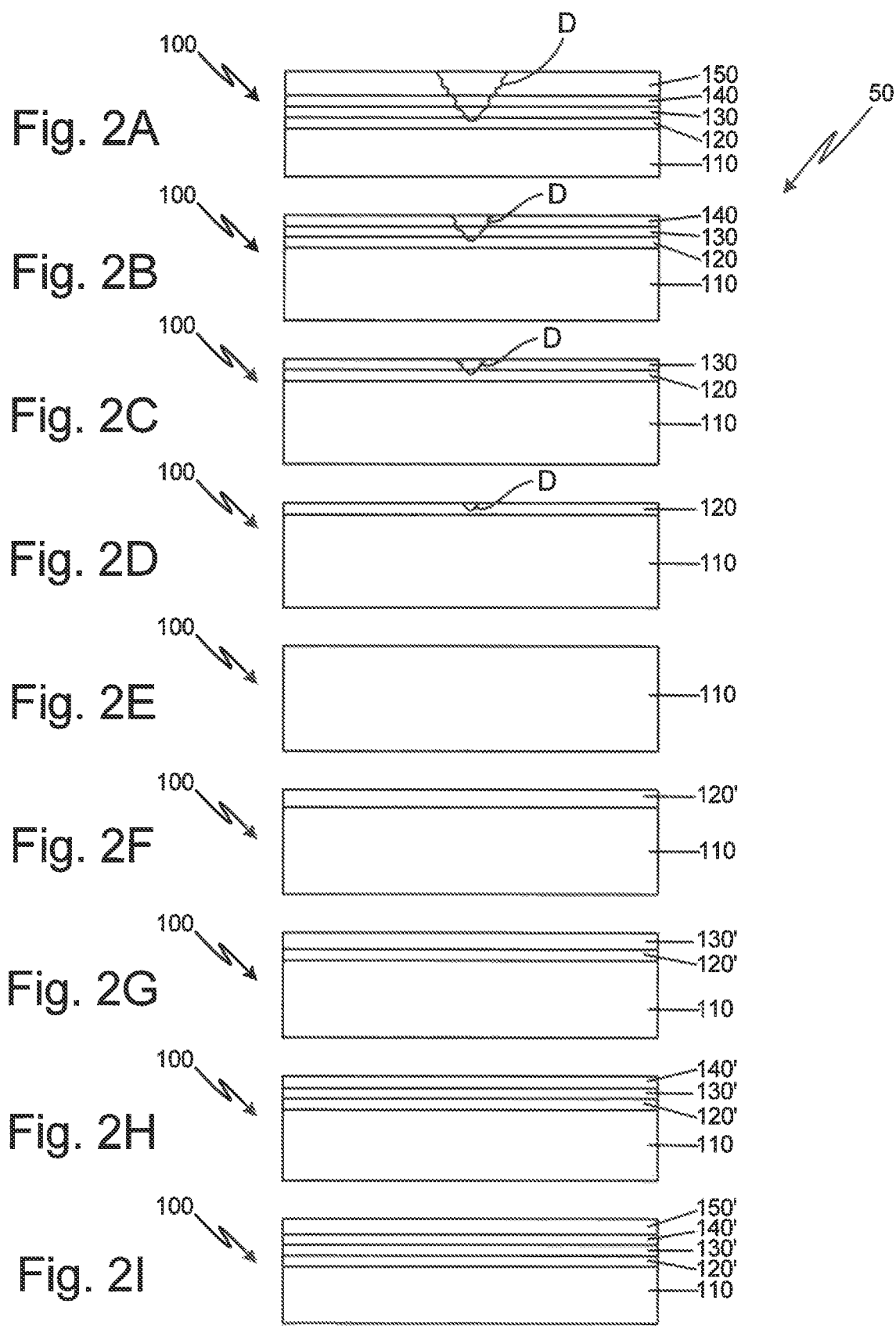

REMOVAL OF EPOXIES FROM METAL SUBSTRATES

BACKGROUND

The present disclosure relates generally to the repair of multi-layer components. More specifically, the present disclosure relates to the removal of toughened epoxies during the repair of multi-layer components.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Gas turbine engines have rows of circumferentially spaced airfoils mounted on respective rotor disks for rotation about an engine axis. Advanced configurations feature shroud-less hollow airfoils manufactured of lightweight materials. The airfoils are designed to high tolerances and typically include a multi-layer coating to accommodate significant operational requirements.

Airfoil coatings erode over time and may be removed and reapplied as part of a repair strategy. The multi-layer coatings can include a structural adhesive. A bond coat primer can also be used to facilitate attachment or enhance the properties of the structural adhesive to bond the underlying substrate to a subsequent layer. Some bond coat primers are 'toughened' by addition of an elastomer to the epoxy resin. These toughened bond coat primers can be resistant to removal by chemical or mechanical means. Although grinding or grit blasting may remove the bond coat primer, frequently the underlying substrate is also partially removed using these techniques, which can result in the component no longer being able to meet the high tolerance geometric requirements of a gas turbine engine. As such, the 'toughened' bond coat primers have conventionally been removed laboriously through hand abrasion techniques over several hours.

SUMMARY

A method of repairing a defectively manufactured multi-layer component having a substrate material and a primer layer includes applying, to the primer layer, a solvent that causes the primer layer to swell to form a swelled primer layer. The method also includes abrading away the swelled primer layer from the multi-layer component and rebuilding the multi-layer component by forming a new primer layer on the substrate material.

A method of repairing a damaged multi-layer component having a substrate material, an anodized layer, a primer layer, a structural adhesive, and a coating includes removing a damaged coating and a structural adhesive from the multi-layer component, exposing the primer layer. The method includes applying to the exposed primer layer, a solvent that causes the primer layer to swell to form a swelled primer layer. The method includes abrading away the swelled primer layer and chemically etching away the anodized layer from the multi-layer component. The method includes rebuilding the multi-layer component by forming a new anodized layer on the material substrate and a new primer layer over the new anodized layer. The method includes applying a new structural adhesive over the new primer layer and a new coating on the new structural adhesive.

BRIEF DESCRIPTION OF THE DRAWINGS

FIGS. 2A-2I are cross-sectional views of a component with a multi-layer coating undergoing a repair process.

DETAILED DESCRIPTION

Figure 1:
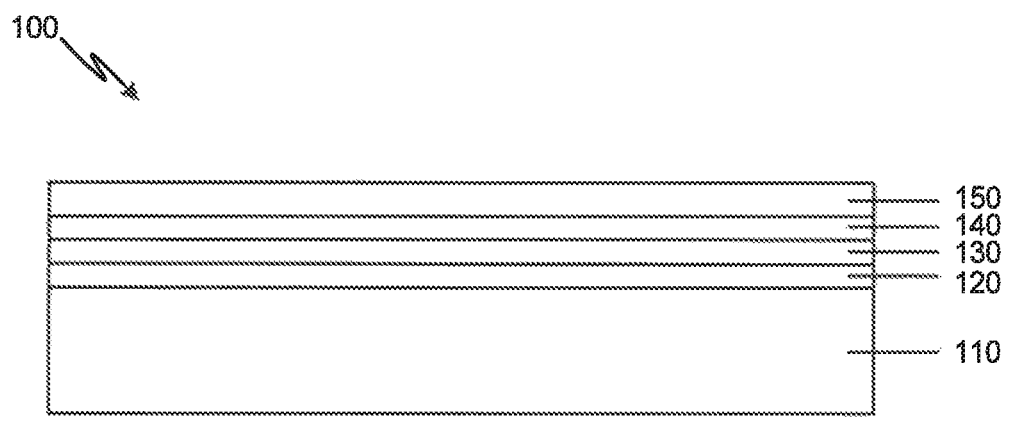
FIG. 1 is a cross-sectional view of a multi-layer component.

Many components within a gas turbine engine require various multi-layer coatings in order to withstand the cyclic high pressures and temperatures or other stresses present in the gas turbine engine under load. As these coatings wear or are damaged, the coatings can be repaired by removal and reapplication of the coatings, extending the useful life of the component. However, some toughened epoxy primers can be resistant to removal by chemical or mechanical means. Herein is disclosed a method for repairing coatings, which include a toughened epoxy layer, using a hybrid technique to first swell the toughened epoxy primer using a suitable composition followed by mechanical abrasion to remove the toughened epoxy layer. The hybrid technique significantly reduces the time needed by a user to mechanically remove the toughened epoxy layer. For example, it can take a typical user several hours to remove the toughened epoxy layer using a hand abrasion technique. In contrast, when the toughened epoxy layer is swelled first, then the user can remove the toughened epoxy layer through hand abrasion techniques in less than an hour.

FIG. 1 is a cross-sectional view of a multi-layer component. FIG. 1 shows component 100 including substrate material 110, anodized layer 120, primer layer 130, structural adhesive 140, and coating 150. Component 100 can be, for example, a compressor blade, turbofan blade, a turboprop propeller blade, tilt rotor prop, vane strut, or other component with a toughened epoxy layer.

Substrate material 110 of component 100 can be formed of any metal or alloy. For example, substrate material 110 can be selected from the group consisting of aluminum, aluminum alloys, titanium, titanium alloys, stainless steel, Hastelloy™ or other metal alloys, Inconel™ or other nickel alloys and alloys of nickel, chromium, and iron, or combinations thereof. Substrate material 110 can be solid throughout or a hollow structure. For example, a hollow structure can include an interior formed of a different material such as a composite material. The hollow structure can also include one or more cavities to reduce the overall weight of component 100 and/or to provide cooling holes or channels to component 100.

Anodized layer 120 is formed on the surface of substrate material 110. Anodized layer 120 is a protection layer of the base metal typically used to reduce oxidation of underlying substrate material 110 during component 100's useful working life. For example, when substrate material 110 is formed of aluminum, anodized layer 120 is an aluminum oxide layer and formed through an acid anodization process. The aluminum oxide layer can be from, for example, 0.00001 inches (0.000254 mm) to 0.0002 inches (0.00508 mm) thick and can have a microscopic roughness. The anodization process changes the crystal structure of the aluminum at the surface of the aluminum and reduces the amount of corrosion and further oxidation of underlying substrate material 110 compared to substrate material 110 formed of aluminum without anodized layer 120. Substrate material 110 formed of metals or alloys other than aluminum can have anodized layer 120 formed of metals or alloys other than aluminum oxide.

Primer layer 130 is applied on top of anodized layer 120. Alternatively, primer layer 130 can be applied directly onto substrate material 110, which typically is applied after a mechanical abrasion of substrate material 110 to remove any surface contaminants. The mechanical abrasion can be, for example, grit blasting or hand abrasion. Primer layer 130 can increase the bond strength between anodized layer 120 and any subsequent layers. Primer layer 130 can have a thickness from, for example, 0.0001 inches (0.00254 mm) to 0.0005 inches (0.0127 mm). Primer layer 130 is a toughened epoxy primer. For example, in one embodiment primer layer 130 is formed of product number EC-3924B, commercially available from 3M™. Although not wanting to be limited by theory, it is believed that toughened epoxies have an elastomer component that makes them more resistant to chemical and mechanical removal means compared to epoxies without an elastomer component. Epoxies without an elastomer component can be brittle and easier to remove compared to toughened epoxies. It is also believed that the toughened epoxy may infiltrate into groves present on the surface of an anodized layer, making the removal of the toughened epoxy difficult without also removing substrate material.

Primer layer 130 can include a second primer layer to impart various characteristics. For example, the second primer layer can include active corrosion resistant moieties to protect underlying substrate material 110 from corrosion damage. One embodiment may include hexavalent chromium as the active corrosion resistant moiety. One embodiment may include a non-(hexavalent chromium) moiety as the active corrosion resistant moiety.

Structural adhesive 140 is formed of a composition selected from the group consisting of polyurethanes, polyimides, epoxy based materials, or combinations thereof that bond together substrate material 110 with coating 150. Structural adhesive layer 140 can have a thickness from 0.0001 inches (0.00254 mm) to 0.005 inches (0.127 mm). Structural adhesive 140 together with primer layer 130 provides a strong bonding network between anodized layer 120 and coating 150.

Coating 150 helps to further protect underlying substrate material 110 from corrosion and impact damage. For example, coating 150 can protect substrate material 110 from corrosive elements such as rain or from impact damage such as from birds, ice, or other objects. In one embodiment, coating 150 is a metallic sheath, which covers a leading edge of an airfoil. The metallic sheath can be formed of, for example, titanium, stainless steel, aluminum alloys, or nickel alloys. Coating 150 can also be, for example, an airfoil cover, wear pads, or seals.

Alternatively, coating 150 is formed of polyurethane or other suitable polymer coating that extends the component's useful working life compared to a component without a coating. A polymer coating is applied directly onto primer layer 130 without structural adhesive 140. Coating 150 can be a thickness from 0.003 inches (0.0762 mm) to 0.06 inches (1.524 mm).

The layers on substrate material 110 of component 100 work as a system to decrease corrosion and impact damage to substrate material 110 during the component's useful working life. Nonetheless, the layers can erode over time due to the high pressures and temperatures present within a gas turbine engine under load. The layers can also be damaged by an object striking the surface of component 100 under load. For example, during engine operation a bird, ice, or other object can enter the gas turbine engine and cause impact damage to component 100. Alternatively, one or more layers of component 100 can be defectively manufactured and, as such, be removed and reapplied. For example, the primer layer may be applied too thinly or thickly or have voids, porosity, or bubbles, leading to an improper cure. In one embodiment, only the defectively manufactured primer layer is removed and subsequently reapplied. Alternatively, only the structural adhesive and the primer layer are removed and subsequently reapplied.

For further example, the structural adhesive may not reach a required temperature, pressure, or remain at the required temperature and pressure for the specified duration, leading to an improper cure. Additionally, the structural adhesive man create a bondline during cure or have porosity, resulting in inadequate bond strength in the final component. These manufacturing defects can be repaired before the component is put into service.

FIGS. 2A-2I are cross-sectional views of component 100 undergoing repair process 50. FIG. 2A shows component 100 in need of repair at damaged site D and includes substrate material 110, damaged anodized layer 120, damaged primer layer 130, damaged structural adhesive 140, and damaged coating 150. Although anodized layer 120, primer layer 130, structural adhesive 140, and coating 150 are shown in FIG. 2A as all being damaged at site D, in other embodiments only one layer is damaged or defective. Component 100 can be, for example, a compressor blade, turbofan blade, a turboprop propeller blade, tilt rotor prop, vane strut, or other component with a toughened epoxy layer.

FIG. 2B shows component 100 with damaged site D including substrate material 110, damaged anodized layer 120, damaged primer layer 130, and damaged structural adhesive 140. Damaged coating 150 has been removed. In one embodiment, coating 150 is a metallic sheath on the leading edge of an airfoil. Usually, the metallic sheath is destroyed as the sheath is mechanically pried off of component 100.

Alternatively, a polymer coating can be removed through mechanical means, such as mechanical or hand abrasion, grit blasting, grinding, or sanding or through chemical means, such as application of a chemical or paint stripper or other suitable stripping agent, which removes the polymer coating, but does not etch or otherwise damage underlying substrate material 110.

FIG. 2C shows component 100 with damaged site D including substrate material 110 and damaged anodized layer 120, and damaged primer layer 130. Damaged structural adhesive 140 has been removed. Structural adhesive 140 can be removed through mechanical means such as mechanical or hand abrasion, grit blasting, grinding, or sanding or through chemical means such as application of a chemical or paint stripper or other suitable stripping agent, which removes the structural adhesive, but does not etch or otherwise damage underlying substrate material 110. Alternatively, component 100 does not include structural adhesive 140 when a polymer such as polyurethane is used as coating 150. Notably, primer layer 130 is resistant to removal by conventional mechanical or chemical means.

FIG. 2D shows component 100 with damaged site D including substrate material 110 and damaged anodized layer 120. Damaged primer layer 130 has been removed. Primer layer 130 is a toughened epoxy layer. For example, grit blasting using a plastic media easily removes structural adhesive 140, but leaves primer layer 130 intact. Although not wanting to be limited by theory, it is believed that primer layer 130 includes an elastomeric component making primer layer 130 flexible and able to absorb a greater amount of abrasive energy compared to a more brittle primer layer that does not include an elastomeric component.

A swelling solvent is applied to the surface of primer layer 130, which swells as at least some of the swelling solvent is absorbed by primer layer 130. Primer layer 130, while in a swelled state, is much more susceptible to abrasive techniques. For example, the time required for primer layer 130 removal by hand abrasion is reduced by ten-fold when primer layer 130 is in a swelled state compared to when primer layer 130 is in a non-swelled state. The swelling solvent can be any solvent capable of swelling primer layer 130. For example, a neutral peroxide paint remover available from PPG Aerospace, product code Eldorado PR-5044, can be used to swell primer layer 130. The swelling solvent can evaporate, returning primer layer 130 to a non-swelled state. The swelling solvent can be re-applied, which results in the re-swelling of primer layer 130.

FIG. 2E shows component 100 with substrate material 110. Damaged anodized layer 120 has been removed. Anodized layer 120 can be removed by chemical etching. For example, chromic-phosphoric acid etching (CPAE) can be used to remove anodized layer 120 without etching substrate material 110.

FIG. 2F shows component 100 with substrate material 110 and new anodized layer 120'. New anodized layer 120' is formed by acid anodization. For example, the acid can be selected from the group consisting of chromic acid, phosphoric acid, boric sulfuric acid, or sulfuric acid. The removal and application of an anodized layer is specific for the embodiment when substrate material 110 is aluminum. When substrate material 110 is another metal or alloy, a different corrosion prevention layer can be removed and reapplied. Alternatively, the removal and reapplication step of anodized layer 120 can be omitted and primer layer 130 removed and reapplied directly onto anodized layer 120 or directly onto substrate material 110.

FIG. 2G shows component 100 with substrate material 110, new anodized layer 120', and new primer layer 130'. New primer layer 130' is applied to the surface of new anodized layer 120'. FIG. 2H shows component 100 with substrate material 110, new anodized layer 120', new primer layer 130', and new structural adhesive 140'. New structural adhesive 140' is applied to the surface of new primer layer 130'. FIG. 2I shows repaired component 100 with substrate material 110, new anodized layer 120', new primer layer 130', new structural adhesive 140', and new coating 150'. New coating 150' is applied to the surface of new structural adhesive 140'. In one embodiment, new coating 150' is a metallic sheath covering the leading edge of an airfoil. New coating 150' can also be, for example, an airfoil cover, wear pads, or seals.

Components within a gas turbine engine wear under load, are damaged during operation, or can be defectively manufactured. Repair process 50 can extend the useful life of a worn, damaged, or defective component within a gas turbine engine. Repair process 50 reduces the time a user spends removing a toughened epoxy layer adhered to a metal component without significant loss of the underlying substrate metal. While some other treatments may effectively remove a toughened epoxy layer, they can also remove a significant amount of underlying substrate metal. The removal of significant amounts of underlying substrate metal can weaken the overall structural integrity of the component such that it can no longer withstand the cyclic high pressures and temperatures present under load in a gas turbine engine or the component may no longer meet the stringent geometric tolerances of the component in a gas turbine engine.

Discussion of Possible Embodiments

The following are non-exclusive descriptions of possible embodiments of the present invention.

A method of repairing a defectively manufactured multi-layer component having a substrate material and a primer layer includes applying, to the primer layer, a solvent that causes the primer layer to swell to form a swelled primer layer. The method also includes abrading away the swelled primer layer from the multi-layer component and rebuilding the multi-layer component by forming a new primer layer on the substrate material.

The method of the preceding paragraph can optionally include, additionally and/or alternatively, any one or more of the following features, configurations and/or additional components:

The multi-layer component also has an anodized layer and includes chemically etching away the anodized layer from the multi-layer component, applying a new anodized layer to the multi-layer component, and applying the new primer layer over the new anodized layer.

The substrate material is formed of aluminum.

The multi-layer component has a coating and a structural adhesive and also includes removing the coating from the multi-layer component, removing the structural adhesive from the multi-layer component and exposing the primer layer, and rebuilding the multi-layer component by forming the new structural adhesive on the new primer layer, and the new coating on the new structural adhesive.

The coating is formed of a metal or alloy.

The coating includes at least one of a sheath, an airfoil cover, a wear pad, or a seal.

The multi-layer component has a coating and further includes removing the coating from the multi-layer component and rebuilding the multi-layer component by forming, the new coating on the new primer layer.

The primer layer and the new primer layer are toughened epoxies.

A multi-layer component repaired by any of the above methods.

A method of repairing a damaged multi-layer component has a material substrate, an anodized layer, a primer layer, a structural adhesive, and a coating. The method includes removing the coating from the multi-layer component, removing the structural adhesive from the multi-layer component and exposing the primer layer, and applying, to the exposed primer layer, a solvent that swells the first primer layer to form a swelled primer layer. The method further includes abrading away the swelled primer layer from the multi-layer component, chemically etching away the anodized layer from the multi-layer component, and forming a new anodized layer on the material substrate. The method further includes applying a new primer layer over the new anodized layer, applying a new structural adhesive over the new primer layer, and applying a new coating over the new structural adhesive.

The method of the preceding paragraph can optionally include, additionally and/or alternatively, any one or more of the following features, configurations and/or additional components:

The substrate material is formed of aluminum.

The primer layer and the new primer layer are toughened epoxies.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of repairing a defectively manufactured multi-layer component that includes a substrate material, a coating, a structural adhesive, and a primer layer, the method comprising:
    removing the coating from the multi-layer component, wherein the coating is formed of a metal or alloy;
    removing the structural adhesive from the multi-layer component and exposing the primer layer;
    applying, to the primer layer, a solvent that causes the primer layer to swell to form a swelled primer layer;
    abrading away the swelled primer layer from the multi-layer component;
    rebuilding the multi-layer component by forming a new primer layer on the substrate material; and
    rebuilding the multi-layer component by forming a new structural adhesive on the new primer layer, and a new coating on the new structural adhesive.

2. The method of claim 1, wherein the multi-layer component also includes an anodized layer, the method further comprising:
    chemically etching away the anodized layer from the multi-layer component; and
    applying a new anodized layer to the multi-layer component, wherein the step of forming the new primer layer further comprising forming the new primer layer over the new anodized layer.

3. The method of claim 2, wherein the substrate material is formed of aluminum.

4. The method of claim 1, wherein the coating includes at least one of a sheath, an airfoil cover, a wear pad, or a seal.

5. The method of claim 1, wherein the substrate material is formed of aluminum.

6. The method of claim 1, wherein the primer layer and the new primer layer are toughened epoxies.

7. A method of repairing a damaged multi-layer component that includes a material substrate, an anodized layer, a primer layer, a structural adhesive, and a coating, the method comprising:
    removing the coating from the multi-layer component, wherein the coating is formed of a metal or alloy;
    removing the structural adhesive from the multi-layer component and exposing the primer layer;
    applying, to the exposed primer layer, a solvent that swells the exposed primer layer to form a swelled primer layer;
    abrading away the swelled primer layer from the multi-layer component;
    chemically etching away the anodized layer from the multi-layer component;
    forming a new anodized layer on the material substrate;
    applying a new primer layer over the new anodized layer;
    applying a new structural adhesive over the new primer layer; and
    applying a new coating over the new structural adhesive.

8. The method of claim 7, wherein the substrate material is formed of aluminum.

9. The method of claim 7, wherein the primer layer and the new primer layer are toughened epoxies.

* * * * *